(12) United States Patent
Engelhardt

(10) Patent No.: US 7,504,819 B2
(45) Date of Patent: Mar. 17, 2009

(54) DYNAMIC LINE RATING SYSTEM WITH REAL-TIME TRACKING OF CONDUCTOR CREEP TO ESTABLISH THE MAXIMUM ALLOWABLE CONDUCTOR LOADING AS LIMITED BY CLEARANCE

(75) Inventor: John Engelhardt, Greenwich, CT (US)

(73) Assignee: Underground Systems, Inc., Armonk, NY (US)

( * ) Notice: Subject to any disclaimer, the term of this patent is extended or adjusted under 35 U.S.C. 154(b) by 19 days.

(21) Appl. No.: 11/654,232

(22) Filed: Jan. 17, 2007

(65) Prior Publication Data
US 2007/0200556 A1 Aug. 30, 2007

Related U.S. Application Data

(63) Continuation of application No. PCT/US2005/025670, filed on Jul. 20, 2005.

(51) Int. Cl.
*G01R 21/02* (2006.01)
*G01R 21/00* (2006.01)

(52) U.S. Cl. .......................... 324/106; 324/142; 702/65

(58) Field of Classification Search ................. 324/104, 324/106, 142; 702/65
See application file for complete search history.

(56) References Cited

U.S. PATENT DOCUMENTS

| 5,181,026 A | | 1/1993 | Granville |
| 5,341,088 A | * | 8/1994 | Davis ........................ 324/106 |
| 5,517,864 A | * | 5/1996 | Seppa ................... 73/862.391 |
| 5,859,596 A | | 1/1999 | McRae |
| 7,039,535 B2 | * | 5/2006 | Nam et al. .................... 702/65 |

* cited by examiner

*Primary Examiner*—Ha Tran T Nguyen
*Assistant Examiner*—Emily Y Chan
(74) *Attorney, Agent, or Firm*—Frommer Lawrence & Haug LLP; William S. Frommer (57) ABSTRACT

Maximum transmission line or conductor loading of an overhead transmission line or conductor spanning two transmission line towers is determined by using a sensing device clamped to the overhead transmission line. The sensing device acquires real-time information that is used in an iterative process to determine sag, limiting temperature, maximum current load and minimum clearance of the transmission line or conductor.

9 Claims, 3 Drawing Sheets

DYNAMIC LINE RATING SYSTEM WITH REAL-TIME TRACKING OF CONDUCTOR CREEP TO ESTABLISH THE MAXIMUM ALLOWABLE CONDUCTOR LOADING AS LIMITED BY CLEARANCE

RELATED APPLICATIONS

This is a continuation of copending International Application PCT/US2005/025670 having an international filing date of Jul. 20, 2005.

BACKGROUND OF THE INVENTION

1. Field of the Invention

The present invention relates to electric power transmission systems, especially those employing overhead electric power lines, and deals more particularly with a system for determining the present un-stretched length of a conductor in the span between support towers at a reference temperature from a measurement of a present inclination angle and the present conductor temperature. Knowledge of the present un-stretched length of the conductor at a reference temperature enables the computation of the maximum load current that the conductor can presently carry for the existing weather conditions without violating a pre-determined amount of conductor sag or clearance between the conductor and objects that exist below the conductor. The maximum load determination is performed on a real-time basis by taking into consideration at least the thermal effects of line current, weather conditions, solar radiation, and the present state of the conductor which includes the effect of conductor creep that may have occurred since the conductor was initially installed.

The present invention further relates to a specific calculation methodology to arrive at a maximum allowable conductor temperature that corresponds to a clearance limitation, between the conductor and the ground or objects directly beneath the conductor, in real time, even as the conductor is experiencing ongoing creep.

2. Description of the Related Art

As the load on an electric power system grows, the line current increases and energy losses become greater. The line current increases also have an adverse effect on clearance limitations of the power transmission lines. The load is measured in terms of the product of volts (V) and current (I), or VA. In the past it has been standard practice to increase the voltage level of the power transmission lines in order to meet growing consumer and business demands, thereby lowering the current and minimizing the energy losses.

However, this approach may be undesirable because of the potential adverse environmental effects of the higher voltage levels, including high electric fields, radio and television interference, audible noise and induced voltage. If higher voltage levels are not employed to satisfy increased demands, one option to power utility companies is to increase the current of the transmission line. However, increasing the current carried by the transmission line produces higher energy losses, which leads to higher conductor temperatures, increased sag and smaller clearance of the power transmission lines.

To effectively utilize overhead electrical power transmission lines, it is necessary to determine their actual thermal capacity in real time which in turn determines the maximum amount of electrical current that the transmission lines may safely carry to control sag and comply with minimum clearance restrictions. In the past, design ratings for the lines have been derived from theoretical calculations based on assumed weather conditions and selected values of conductor temperature. Safe values of conductor temperature are based on line clearance requirements, loss of tensile strength, and creep criteria.

Weather conditions substantially affect the current carrying capacity of an overhead electrical power line. Theoretical calculations are normally based on assumptions of low wind speeds perpendicular to the conductor, high ambient temperatures and maximum solar radiation. As a result, the calculation for arriving at a design rating is based on the assumption that the weather has a minimum cooling effect on the conductor while maximizing the amount of heat absorbed by the conductor. This ensures that the line temperature is normally less than the highest attainable temperature when the line is carrying the rated load, the sag of the line is prevented from exceeding a pre-selected safe clearance above the ground, and the conductor is prevented from losing more than an acceptable amount of tensile strength.

However, this assumption is not always accurate because it is based on assumed wind speeds and ambient temperatures. Therefore, by employing such approximations, the sag cannot be determined accurately on a real-time basis, which is critical when loading is at or near the rating of the line.

One known system for rating electric power transmission lines and equipment is disclosed in U.S. Pat. No. 4,806,855. The system described in the '855 patent determines the current carrying capability of one or more overhead power transmission lines on a real-time basis by taking into consideration the thermal effects of line current, wind velocity, wind direction, solar radiation and ambient temperature on the line conductor.

Another system for rating electric power transmission lines and equipment is disclosed in U.S. Pat. No. 5,140,257. The '257 patent describes a system where the thermal state of each monitored line span is determined by measuring the conductor temperature, line current, solar radiation, ambient temperature, and in some cases wind speed and wind direction.

These parameters are monitored by a sensor-transmitter unit that may be removably clamped on the line conductor, which may range in size from one half inch to several inches in diameter, and includes a radio transmitter for transmitting sensed data to a receiving substation. The data from the sensor-transmitter is transmitted by a telecommunications link to a computer, which automatically determines line capacity using the real-time data. The computer also calculates the time required for the "critical span" having the lowest current capacity to reach its maximum safe temperature based on any of a number of step changes in load demands.

Still another system is disclosed in U.S. Pat. No. 5,341,088. The system of the '088 patent provides, in one embodiment, an inclinometer that is installed in a line-mounted sensor that senses the angle of inclination of the overhead line conductor at the point where the sensor is installed, and the value of this inclination is used to compute, in real time, the maximum allowable conductor temperature that the line can experience without violating its minimum clearance. The angle of the line is used to compute the sag of the line at the conductor temperature that exists at the time of the measurement, which is then used to determine the maximum allowable conductor temperature.

However, the '855, '257 and '088 patents, do not describe a calculation methodology to arrive at the maximum allowable conductor temperature in real time that corresponds to the clearance limitation and do not take into consideration the ongoing creep.

As is apparent from the foregoing, the factors that limit the current rating to a safe value are a function of conductor temperature. Thus, if the line conductor temperature and weather conditions are closely and accurately monitored on a real-time basis, then the maximum real-time current could be substantially greater than the conservative design rating for a large portion of time during the year.

For the foregoing reasons, there is a need for a system and method for determining the maximum allowable conductor temperature that corresponds to the minimum conductor clearance, in real time, even as the conductor is experiencing ongoing creep.

SUMMARY OF THE INVENTION

The present invention provides a system for rating the current carrying capacity of electric power lines and associated equipment, based on measurements of the temperature of the line, line loading, related ambient conditions affecting the thermal rating, and the conductor inclination on a real-time basis. Rating the current carrying capacity is achieved by measuring the line current, conductor temperature, ambient temperature and solar radiation for a typical span of the line. Having determined the thermal state of the conductor, the maximum current that each span may carry is calculated in real-time based on the mechanical state of the conductor including the effect of ongoing creep.

A primary objective of the present invention is to provide a procedure that determines the present value of the un-stretched length of the conductor in the span at a reference temperature, from the measurement of the present inclination angle and the present conductor temperature.

A second objective of the present invention is to provide a measurement and calculation procedure to obtain the desired maximum allowable conductor temperature, as limited by the minimum clearance restriction, in real time, even as the conductor is experiencing ongoing creep.

It is a further object of the present invention to determine a real-time reference length of the conductor that includes the effect of conductor creep that permits the real-time determination of the maximum allowable conductor temperature.

It is still a further object of the present invention to determine the maximum allowable conductor temperature that will result in the maximum allowed sag and the minimum allowed clearance, thereby permitting the real-time determination of the maximum current load that could be placed on the conductors.

It is yet another object of the present invention to determine the length of the catenary curve of the transmission line conductor spanning its support towers in real time that includes the effect of the conductor creep that has occurred since the conductor was installed.

According to the present invention, a system for measuring maximum permissible transmission line or conductor loading of overhead transmission lines or conductors connected between transmission line towers includes a sensing device clamped to the overhead transmission lines. The sensing device transmits to a remote information processing center acquired real-time information that includes at least parameters of the catenary, sag, clearance, temperature(s) and an un-stretched length of the conductors. This information is used to determine the real-time maximum permissible transmission line or conductor loading including the effect of conductor creep that has taken place since the conductors were installed.

The various features of novelty, which characterize the invention, are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated.

BRIEF DESCRIPTION OF THE DRAWINGS

The following detailed description, taken by way of example, will best be understood in conjunction with the drawings wherein.

DETAILED DESCRIPTION OF THE INVENTION

The following describes a novel method of calculating the desired maximum allowable conductor temperature, as limited by the minimum clearance restriction, in real time, even as the conductor is experiencing ongoing creep.

Conductor Temperature

The behavior of an overhead conductor span is controlled by its temperature. In the steady state, the conductor temperature is established by a balance of heat generated by load current $i^2R$ losses and solar heat input with heat radiated and heat removed by surrounding air. In the unsteady state, heat absorbed or released from the heat capacity of the conductor is included in this balance.

The conductor temperatures, in turn, define a length of the conductor and, therefore, sag and the clearance of the catenary curve that is formed between the support points at each end of the span. In other words, the common parameter for determining existing load, the maximum load capability and, ultimately, the conductor clearance is the conductor temperature.

Once the transmission line is installed and "clipped in," there is a unique relation between conductor temperature and the transmission line clearance to any particular object below the transmission line. This relation follows the mathematical laws of thermal expansion, elastic extension and the catenary curve. However, this relation changes over time because of ongoing conductor creep.

Dynamic Line Rating Systems

Dynamic Line Rating (DLR) Systems have been developed and are in common use. In general, most sensors that have been proposed for dynamic line rating of electrical power lines are designed to be permanently installed on high voltage transmission lines. The typical transmission line sensor available in the prior art measures quantities associated with operation of the overhead transmission line, such as voltage on the conductor, current flow in the conductor, conductor temperature and ambient temperature. This information is gathered and transmitted to a local ground receiver. Data from various ground receivers is ultimately transmitted to a central control station where the information is analyzed. Based on this analysis, the entire power transmission system is controlled with power being supplied to the various transmission lines in accordance with the measured parameters.

The preferred embodiment of these systems utilize one or more temperature sensors such as a Power Donut®, which is described later on. The Power Donut® is sold by Underground Systems, Inc. of Armonk, N.Y. (the assignee of the present invention). It is mounted on the overhead conductor and transmits conductor temperature and load current data by radio to a ground level receiver where this data is combined with other weather data and used to compute, in real time, the effective wind conditions acting to cool the conductor and other parameters. These conditions and parameters define the maximum current that the transmission line can carry, as limited by a pre-defined maximum allowed conductor temperature established by the power transmission line designer to insure that the minimum clearance requirement of the conductor relative to the ground or objects directly below the conductor is not violated.

The mechanical properties of conductor materials that are used by a transmission line designer are determined experimentally by conductor manufacturers. These properties generally can be categorized into two groups. The first group defines the conductor properties to be used for the initial stringing operations, and the second group provides estimates of those properties after the conductor has been in service for a period of time, such as ten years, and experienced a typical amount of creep. The power transmission line design criteria are governed by allowable sag that corresponds to an absolute clearance limit. When the transmission line is installed, the sag is less at the limiting temperature, to allow room for the sag to increase naturally as creep takes place.

Utility companies occasionally check on the status of their overhead conductors by making a field survey of sags and clearances. Using survey equipment accomplishes this task. The height of the lowest conductor is measured at the lowest point of its catenary, and the temperature of the conductor at that same time is estimated by using the prevailing weather conditions and the current loading on the conductor.

In this way, utility companies can infer the position of the conductor at its maximum allowed temperature, as set by the transmission line designer, and confirm that operation at that temperature is safe and will not violate its clearance limit. This exercise is simplified and made more accurate if a real-time conductor temperature measurement is available from a line-mounted sensor.

The effectiveness of a DLR system is enhanced if the computations produce not only a real-time rating of a transmission line, but also a real-time calculation of the sag or position of the conductor and its clearance to the ground below. Software that computes the ratings can easily perform these additional calculations if the conductor sag is known as a function of its temperature.

When the limiting temperature and clearance of the transmission line are established on the basis of the conductor's estimated ten-year creep, it is possible that the conductor has actually experienced less creep over its life. If that is the case, the limiting temperature that causes the conductor to reach its clearance limit might be increased. Any increase in limiting temperature provides a corresponding increase in the rating of the transmission line, and is therefore desirable.

It is also possible that the transmission line has experienced more creep than expected. In this case, the transmission line's clearance is reduced at its rated temperature and an unsafe condition might result that could threaten human life and the reliability of the transmission line. Clearly, the accurate determination of the maximum allowable conductor temperature that produces the correct amount of sag to satisfy the clearance limit depends on the amount of creep that has transpired to date.

Sensor

Figure 1:
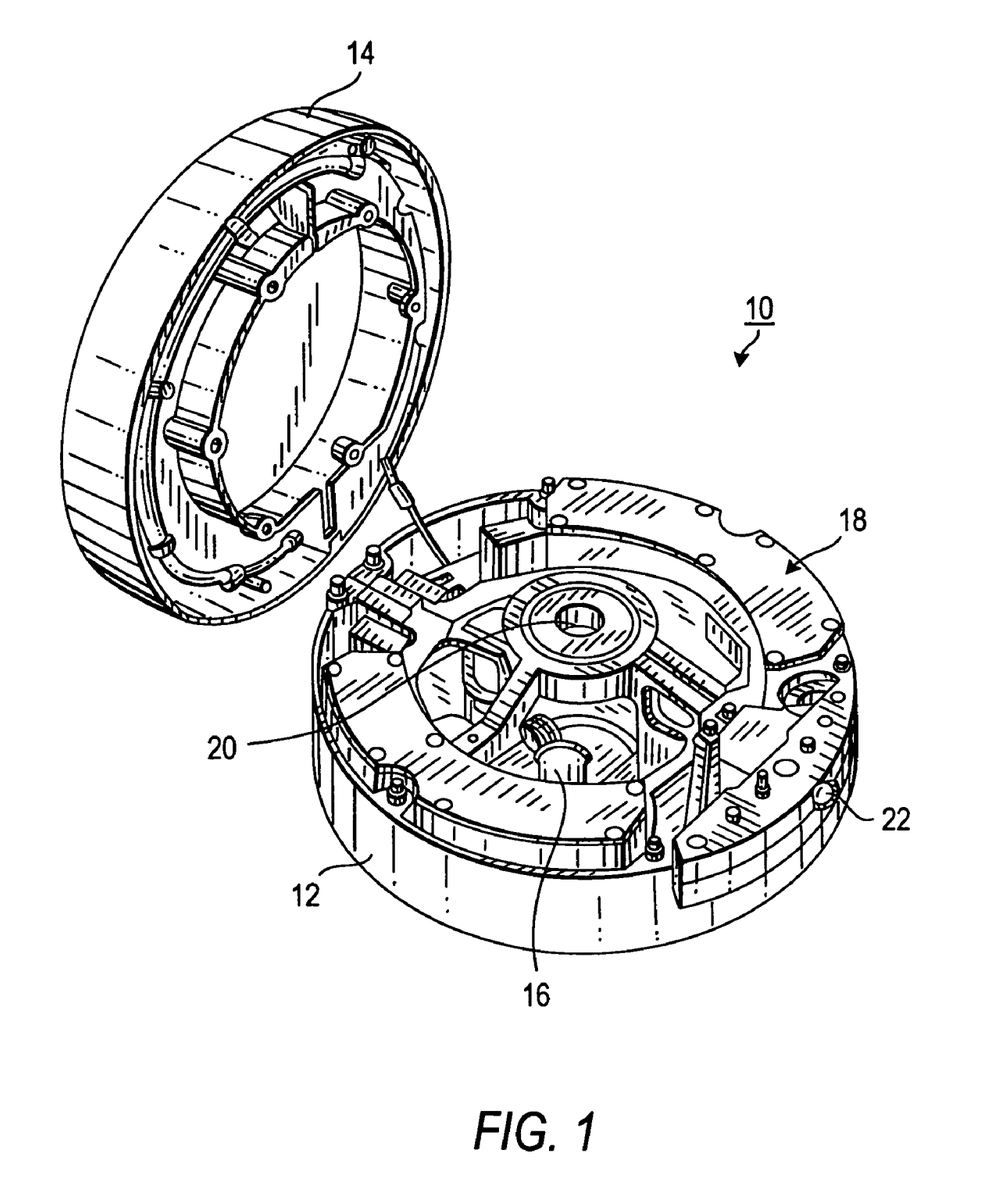
FIG. 1 is a diagram of a preferred sensor that can be used with the present invention.

The preferred sensor is the Power Donut®, which is an engineering instrumentation platform whose functions include: data acquisition, data monitoring and logging the parameters of high voltage overhead conductors. The sensor preferably is completely self-contained, allowing for hot stick installation with no required outage of the transmission line on which it is mounted. The product is available with communication options that integrate with new or existing monitoring and control systems. The preferred sensor is a versatile platform with which to implement several utility engineering applications. Accurate, reliable and economical, the preferred sensor is an ideal accessory for high voltage overhead conductor systems. One example of the sensor with which the present invention finds ready application is illustrated in FIG. 1 as sensor 10. The sensor is formed of a main section 12 and a cover 14, thereby forming a housing in which are mounted probes 16, and a signal transmitter and power supply 18. The housing includes a central aperture 20 through which passes the transmission line conductor. Preferably, for three-phase transmission and/or distribution lines, one sensor is used for each of the phases.

The housing is hinged, as shown at 22, to permit mounting on the transmission line conductor. That is, the housing is opened about its hinge, mounted by "hot stick application" to the transmission line, and then closed to completely circumscribe the line. The probes within the housing include a temperature probe, an inclinometer, a current measuring probe and other sensor devices to sense parameters useful for transmission line rating. The current measuring probe typically is a Rogowski coil 16. Reference is made to U.S. Pat. No. 4,886,980 for a more complete description of sensor 10. It will be appreciated that the information picked up by the sensor, e.g. temperature, angle of the catenary curve at the location of the transmission line conductor at which the sensor is mounted, current through the conductor and the like, is transmitted to a base station for processing, described below. Transmission to the base station preferably is by way of cellular telephone transmission, although other conventional transmission techniques, such as via radio transmission over unassigned frequency bands, may be used. Alternatively, the sensor itself may include programmed processors to carry out the data processing for line rating; and the result of such data processing may be communicated, as by the transmission techniques mentioned above, to a ground station.

The system in which the sensor is utilized provides data in a format that utility companies can readily use. Data, including real-time ratings, advanced diagnostics and other data of specific interest to quantify and optimize a power delivery system can be readily "grabbed."

The present invention utilizes a sensor, which is equipped with an inclinometer that provides a real-time measurement of the angle between the axis of the sensor and a horizontal line, and the real-time measurement of a surface temperature of the overhead line conductor on which it is mounted. The measured angle provides information used to fully describe the parameters of the catenary and to compute the sag and clearance of the conductor in the span.

The temperature measurement provides the ability to establish the un-stretched length of the conductor at a reference temperature, adjust it to a different temperature and compute the parameters of the catenary that results, including the sag and clearance of the conductor at the different temperatures.

This capability also provides the ability to determine the conductor temperature that results in the maximum allowed sag and the corresponding minimum clearance that is then used to compute the maximum current loading that the line can carry for the present weather conditions.

This system also provides the data needed to determine the amount of conductor creep that has taken place since the first readings were made, or since the line was installed if the un-stretched length and the conductor temperature at that time were recorded or were determined from sag and tension data obtained during the installation process.

Creep and Load

Creep is the permanent elongation of the aluminum component of a transmission line conductor due to everyday tensions that the conductor experiences over its lifetime.

Creep occurs at a rate that is proportional to the tensile stress applied to the aluminum strands. This rate at a particular tensile stress increases with the temperature of the strands. When a conductor is suspended between two towers as it normally is in an overhead transmission line, the tension that is applied to the conductor when it is installed establishes the shape of the catenary, the amount of sag of the conductor for its temperature at that time, and the conductor length in the span. As this tension is increased, the sag and length will decrease. Once installed, the tension in the conductor decreases as its temperature increases because of the thermal expansion of the conductor. The tension will be increased if the conductor cools, if an additional weight is added to the conductor in the form of a coating of ice, or if a drag force on the conductor is created by wind blowing across the conductor. As time goes by, the conductor temperature and tensile stress will tend to vary inversely because of the interaction of the conductor and catenary properties. If the conductor is comprised of only aluminum strands, creep can be expected to increase all of the time. If the conductor is a composite of aluminum and steel, the stress in the aluminum strands as a percentage of the total stress will be reduced as the temperature increases because the aluminum expands more than the steel with temperature. At some elevated temperature, the aluminum stress will go to zero and the steel core will carry all of the stress. Thus, creep of the aluminum component of an ACSR conductor will tend to occur at a higher rate at very low conductor temperatures, and may not occur at all at high operating temperatures.

Creep Analysis for a Uniform Conductor

Figure 2:
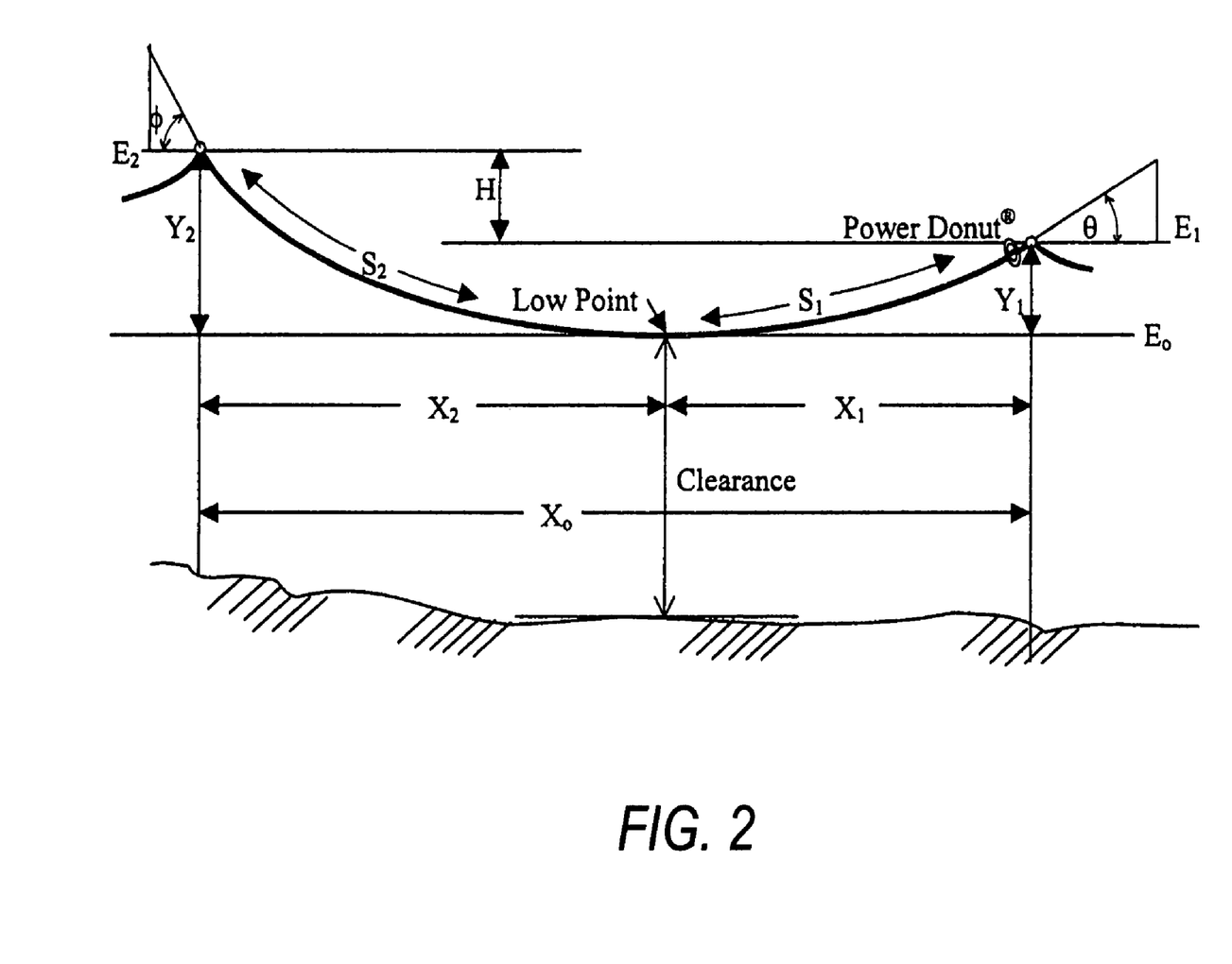
FIG. 2 is a diagram of a typical span conductor suspended between two towers.

A typical span of a conductor suspended between two towers is shown in FIG. 2.

Sag and tension analysis is described first for a conductor that is comprised of strands of one material, such as an all aluminum conductor, where thermal and elastic properties are uniform throughout the individual wires that comprise the conductor assembly.

The analysis is then described for a composite conductor that is made up of two or more materials that may have different thermal and elastic properties, such as a steel-reinforced aluminum conductor (ACSR), which contains steel wires for added strength and aluminum wires to carry the load current.

The analysis to be described requires knowledge of the fixed elevations of the conductor support points at each end of the span. If vertical suspension insulator strings support one or both ends of the span, it is assumed that each insulator string remains vertical for the full range of conditions under study. The elevation of the conductor at the end of the span is the elevation of the point of intersection between the vertical axis of the insulator string and the axis of the conductor if the catenary curve of the conductor were extended through the attachment fitting.

If one or both ends of the span are supported by a dead-end insulator string, the length of the insulator string between the tower connection pin and the conductor fitting pin must be known, as well as the fixed elevation of the tower connection pin and the total weight of the insulator string and its fittings. The horizontal distance between the end points of the span must also be known, where the end points are considered to be the pin connections of each insulator string to each tower.

Finally, the length of conductor from the location of the sensor to the near-by conductor fitting must be known, where the conductor end point is either the axis of a vertical insulator string or the pin connecting it to a dead-end insulator string.

Referring to FIG. 2, the span's catenary contains two sections, one to each side of its lowest point. Each section is analyzed separately. Their common variables are the horizontal component of the conductor tension, $F_h$, which is the same everywhere along the catenary, and the elevation and location of the low point, $E_o$ that defines the sag of the span. When a sensor equipped with an inclinometer is mounted close to a support point of the span (typically, the elevation of the conductor at one tower will be less than the elevation of the conductor at the other tower of the span), the angle measured by the sensor approximates the angle of inclination $\theta$ of the conductor at that end of the span.

The catenary curve has a unique shape that is described with knowledge of the horizontal distance $X_o$ between the support points, their elevation difference H, and the inclination angle $\theta$ at the lower support point or $\phi$ at the higher support point. The parameters of interest are the sags $Y_1$ and $Y_2$, the distance from the respective support points to the low point $X_1$ and $X_2$, the lengths of the respective arcs $S_1$ and $S_2$, and the horizontal tension $F_h$.

There are two traditional equations that relate the sag and the arc of the catenary curve to hyperbolic functions of the horizontal distance X from the low point, the horizontal tension $F_h$, and w, the effective weight per foot of the conductor. These equations are:

$$Sag = Y = \frac{F_h}{w}\left[\text{Cosh}\left(\frac{w}{F_h}X\right) - 1\right] \quad (1)$$

$$\text{Arc} = S = \frac{F_h}{w}\text{Sinh}\left(\frac{w}{F_h}X\right) \quad (2)$$

Setting X equal to $X_1$ or $X_2$ produces the sag $Y_1$ or $Y_2$ and arc length $S_1$ or $S_2$ corresponding to the two parts of the catenary between the low point and the two support points.

These equations are difficult to manipulate in closed form because the $F_h/w$ term appears both within the hyperbolic functions and outside of them. However, a two-step iterative process for this system has been developed and is described below.

The first step of the process assumes a value for the horizontal tension and iterates to find the corresponding values of $X_1$ and $X_2$ that result in a match between the difference of the two sags, $Y_1$ and $Y_2$ that are computed using Equation 1, and the known difference in the elevations of the two support points, H. The second step compares the measured angle at the sensor to the corresponding calculated angle, and iterates on the horizontal tension to match these angles.

To compute the sags and arcs with Equations 1 and 2, the distance, $X_i$, from the low point to a support point and the horizontal tension $F_h$, must be established. The unit weight w of the conductor for the conditions of interest also should be known.

The weight of the conductor is not constant; it changes as the length of the conductor changes due to thermal expansion and contraction, and also changes as a result of elastic and inelastic extension caused by the tension it must support. While these changes are small, they are easily incorporated into the analysis, and improve the accuracy of the calculations.

The sensor is equipped with temperature sensors that measure the surface temperature $T_1$ of the conductor arc $S_1$ at the same time that the inclination angle is recorded. Usually $T_1$ will equal $T_2$, the surface temperature of the conductor arc $S_2$. There may, however, be certain conditions involving the sun's angle of incidence where one side of the span receives noticeably more heat from the sun than the other. By treating the temperatures of the two sides separately, this potential temperature difference is accounted for in the calculations that follow.

If $\alpha$ is the coefficient of thermal expansion of the conductor material, a length of conductor at 20° C., $L_{20i}$, changes to $L_{Ti}$ when its temperature $T_i$ changes, in accordance with the following equation.

$$L_{Ti} = L_{20i}[1+\alpha(T_i-20)]$$

This change in length causes an inverse change in the conductor's unit weight, $w_{Ti}$, at the temperature $T_i$, $$w_{Ti} = \frac{w_{20}}{[1+\alpha(T_i-20)]} \quad (3)$$

where $w_{20}$ is the un-stretched conductor unit weight at 20° C. published by the conductor manufacturer. Thus, the conductor weight is adjusted to match the measured conductor temperature at the start of the calculations, and does not need further attention.

The horizontal tension is the same everywhere on the span, but the total tension varies from its minimum, which equals the horizontal tension at the low point, to its maximums, which occur at the two support points and are generally different unless the span is level.

The average tension $F_{avei}$ in either part of the span is found by noting that the total tension, $F_t(x)$ at any point a distance x from the low point can be expressed with the aid of a vector diagram as, $$F_t(x) = \sqrt{F_h^2 + F_v(x)^2}$$

The vertical tension, $F_v(x)$, at any value of x is w S(x), and using Equation 2 to define S(x), $$F_t(x) = \sqrt{F_h^2 + F_h^2 \text{Sin}h^2(wx/F_h)}$$

This equation reduces to, $$F_t(x) = F_h \text{Cos } h(wx/F_h)$$

This equation can be integrated over the range of x=0 to x=$X_1$ or x=$X_2$ and divided by $X_1$ or $X_2$ to obtain the following simple expression for the average tension in either side of the span, $$F_{avei} = F_h S_i / X_i \quad (4)$$

When the conductor is stretched by an average tension $F_{avei}$, its length increases in accordance with the equation below, $$L_{F,Ti} = L_{Ti}(1+\beta F_{avei})$$

where $\beta$ is the reciprocal of the product of the effective elastic modulus of the conductor material and its cross-sectional area. This change in length causes an inverse change in the conductor's unit weight at the temperature $T_i$ in accordance with Equation 5.

$$w_{F,Ti} = \frac{w_{Ti}}{(1+\beta F_{avei})} \quad (5)$$

The ratio of $S_i$ to $X_i$ is usually very close to 1. Therefore, a value of $F_{avei}$ that equals $F_h$ can be used to establish the conductor weight to begin the iteration process, and this value is updated during the iteration process by computing the average tensions using Equations 2, 4 and 5 each time that the angle is computed. As the iteration converges on its final value of $F_h$, the corrected weights and average tensions are only one step behind and their change at each step becomes negligible.

Step 1

The first step of the iteration process assumes a value for $F_h$ that is lower than what is expected. A value for $X_1$ is then assumed, starting at the center of the span where the low point would be if the span were level. With $F_h$, $w_{F,Ti}$, and $X_1$ defined, $X_2$ is computed as $X_0 - X_1$, and the two sags, $Y_1$ and $Y_2$, are computed using Equation 1.

The difference between $Y_2$ and $Y_1$ is compared to H. If $Y_2 - Y_1$ is less than H, the value of $X_1$ is too large, placing the low point too close to the middle of the span. $X_1$ is then reduced by an incremental quantity $\Delta X$, and $X_2$ is again computed as $X_0 - X_1$. Two new sags are computed and their difference compared to H. If their difference is still smaller than H, the process is repeated, reducing $X_1$ by $\Delta X$ until the sag difference $Y_2 - Y_1$ becomes equal to or greater than H.

When the sag difference becomes equal to or greater than H, $X_1$ is increased by $\Delta X$ and $\Delta X$ is reduced by a factor of ten and subtracted from $X_1$. $X_2$ is re-computed and two new sags are computed and their difference compared to H. If their difference is still smaller than H, the process is repeated, reducing $X_1$ by $\Delta X$ until the sag difference becomes equal to or greater than H. $X_1$ is again increased by $\Delta X$ and $\Delta X$ is reduced by a factor of ten and subtracted from $X_1$. This process is repeated until the value of $\Delta X$ reaches the desired resolution for the solution. A final step after the sag difference exceeds H is to subtract half of $\Delta X$ from $X_1$ and make a final calculation of the two sags. If, at any step, the sag difference exactly equals H, the process is considered to have reached its end point.

Step 2

With step 1 completed, the values of $X_1$ and $X_2$ have been established for the span geometry and the assumed horizontal tension. Step 2 iterates on the tension to seek the solution that also satisfies the measured angle at one end of the span. But first, a correction of the weight can be made by computing the two arcs, $S_1$ and $S_2$, and the two average tensions, $F_{ave1}$ and $F_{ave2}$, of the respective arcs, to adjust $w_{F,Ti}$ with Equation 5.

The angles at the end of the span, $\theta$ and $\phi$, relate the force components acting on the conductor at those points. The vertical force, $F_v$, is equal to the weight of the conductor arc length between the end point and the low point, and the horizontal force is the horizontal tension. The ratio of the vertical to horizontal forces is equal to the tangent of the angle. Since the horizontal tension is defined by step 1, it is only necessary to compute the vertical force, which is equal to the arc length $S_i$, times the newly adjusted conductor weight $w_{F,T,i}$. The arc lengths for both sides are computed using Equation 2. Thus, for the lower side which contains the sensor:

$$F_v = (w_{F,T,1})(S_1)$$

$$\text{Tan}(\theta) = F_v/F_h$$

$$\theta = \text{Tan}^{-1}(w_{F,T,1}S_1/F_h)$$

If the sensor is installed on the higher side of the span, the angle $\phi$ for the higher side is computed to be:

$$\phi = \text{Tan}^{-1}(w_{F,T,2}S_2/F_h)$$

The computed angle ($\theta$ or $\phi$) is compared to the measured angle. If $F_h$ is too small, the computed angle will be larger than the measured angle. In this case, $F_h$ is increased by an increment, $\Delta F_h$, and Step 1 is repeated to define a new catenary to use for Step 2.

When the angle becomes smaller than the measured angle, $F_h$ is reduced by $\Delta F_h$, $\Delta F_h$ is decreased by ten and added to $F_h$, and Step 1 is repeated. If at some point in the process the computed and measured angles match, the solution has been found. Otherwise, the iteration continues until the desired resolution of $F_h$ has been reached. In that case, the final step is to reduce $F_h$ by $\Delta F_h/2$ and repeat Step 1 to determine the solution.

With the span fully defined at the measured temperature, the un-stretched length at a reference temperature of 20° C., $L_{20}$, can be computed by adjusting the final arc lengths for temperature and stretch and adding them as shown in Equation 6.

$$L_{20} = \frac{S_1}{(1 + \alpha(T_1 - 20))(1 + \beta F_{ave1})} + \frac{S_2}{(1 + \alpha(T_2 - 20))(1 + \beta F_{ave2})} \tag{6}$$

The total weight of conductor in the span, $W_0$, cannot change, and it can be computed as the product of $w_{20}$ and $L_{20}$.

$$W_0 = w_{20}L_{20}$$

$W_0$ may be used as a final check on the accuracy of the calculations since it is the only quantity that does not change over time.

The span length $L_{20}$ will not change over time unless the conductor experiences some creep. Therefore, by keeping track of the apparent reference length of the span, the rate of creep over time may be observed; and it provides the basis for an accurate determination of the conductor temperature that results in a particular sag to define the clearance-limited dynamic rating, independent of the amount of creep that has occurred.

For most situations, the starting values of $F_h$ and $\Delta F_h$ are conveniently set at 1000 lbs., and the starting value for $\Delta X$ can be set at 100 feet. As described above, $\Delta$ is reduced by a factor of ten as the iteration proceeds. This results in a "decimal" approach to the final solution, where each step establishes the value of the next smaller digit. Other factors could also be used. For example, a factor of two would result in a "binomial" approach to the final solution, and would entail fewer steps. The process, however, would be more difficult to follow during the programming development stage. With modern high speed computing facilities, the process time for either approach is so short that their difference is inconsequential.

One objective of the present invention is to determine the sag and the present arc length of the conductor that correspond to the measured angle of inclination and conductor temperature, in real time. The above analysis accomplishes that task. Another objective is to determine the maximum load current that the conductor can carry under the present weather conditions without violating a pre-defined clearance for the span. This task is based on the determination of the arc length that corresponds to the sag at the clearance limit. The critical arc length calculation needs to be done only once unless the pre-defined clearance limit changes. The relation between the stretched arc length and conductor temperature is used to compute the conductor temperature, $T_R$, that results in the sag reaching the clearance limit. The computed dynamic rating can then be based on this temperature limit. The critical arc length is fixed by the clearance limit. However, the conductor temperature that produces this arc length may decrease over time because of conductor creep.

The iteration process described for the real-time analysis of the span can be used to determine the stretched arc length at the clearance limit. Step 1, described above, begins the process by assuming a low horizontal tension and finding the values of $X_1$ and $X_2$ that result in $Y_2 - Y_1 = H$. Step 2 is modified to seek a solution that satisfies the clearance limiting sag, or a clearance limit at a specific horizontal distance from one end of the span, rather than matching a measured angle.

When the solution is reached, the two stretched arc lengths, $S_1$ and $S_2$, are computed and reduced to un-stretched arc lengths by dividing each by $(1+\Delta F_{avei})$. The resulting two un-stretched arc lengths are $L_{T1}$ and $L_{T2}$. If the assumption that $T_2 = T_1$ is made, the sum of the two lengths, $L_R$, can be equated to $L_{20}$, the reference length of the span at 20° C., adjusted to the rating temperature. $T_R$ (the limiting temperature) is computed as shown in Equation 7.

$$T_R = \frac{L_R - L_{20}}{\alpha L_{20}} + 20° \text{ C.} \tag{7}$$

This temperature is not a constant since it will vary with the amount of creep that occurs and is reflected in the ongoing determination of $L_{20}$. Therefore, it must be computed each time the measured data is processed.

If the temperatures of the two sides of the catenary are found to be unequal because the angle of incidence of the sun's ray results in the absorption of more solar heat on one side, the above analysis should be modified to determine the limiting temperature of the warmer side only that corresponds to the fixed arc length, $S_i$, defined by the clearance limit catenary. In this case, the reference length of the warmer side of the clearance limit catenary, $L_{20i}$, is used in place of the total span's reference length, $L_{20}$ in Equation 7.

The limiting temperature $T_R$ is used in the dynamic line rating algorithm to establish the load current that will cause the conductor to reach this temperature under present weather conditions. This algorithm determines actual weather conditions, using the measured temperature rise of the conductor at the measured load, combined with the measured air temperature and solar intensity to compute the effective wind speed. With this heat transfer information, the loading that will cause the conductor temperature to reach the rating temperature limit $T_R$ is directly computed using a steady state thermal balance to produce the normal rating, and also using a transient dynamic thermal balance that includes the heat capacity of the conductor to compute short term ratings in the form of the loading that will cause the conductor temperature to reach its temperature limit in a specified time, on the order of minutes up to a few hours.

The foregoing analysis has been derived for an ideal span of conductor using the assumption that the end points of the span are fixed in both the horizontal and vertical directions. There are corrections that need to be considered when the sensor is located some small distance from the support point, and when there is a dead-end insulator at one or both ends of the span. Also, this analysis has assumed that the conductor contains strands of only one material and has uniform elastic and thermal properties. Many overhead conductors are made of aluminum strands applied over a core made up of steel strands to help carry the tensile load. The determination of thermal expansion and tensile loading should be made separately for the two materials, and the load division changes with temperature and the amount of creep that the aluminum has experienced.

Composite Conductor Analysis

Conductors comprised of two components are the most commonly used for overhead transmission lines. One component is a core made up of one or more steel strands. The second component is one or more layers of aluminum strands applied over the steel core. This type of conductor is known as Aluminum Conductor, Steel Reinforced, or ACSR.

The analysis of sag and tension of a span of ACSR conductor is basically similar to that described above for a uniform conductor, with the exception that the thermal and elastic extension of the two components (aluminum and steel) are treated separately and the weight corrections are made after each step 2 of each iteration. After conductor installation and the final connection fittings are installed, the two components will be the same length if each component carries some portion the tensile load. If, however, the conductor temperature gets too high, the aluminum may expand more than the steel and reach a length where the total tension needed to support the conductor is carried by the steel alone. If the conductor temperature gets too low, the opposite may happen. The aluminum may contract more than the steel to the point where the aluminum alone carries the full tensile load. In between these two extremes, the load division varies between the steel and aluminum components, favoring the steel as the temperature increases.

The length of each of the conductor components is described on the basis of thermal and elastic expansion and contraction of a reference length, again chosen to be the un-stretched length at 20° C. The coefficients of thermal expansion are $\alpha_S$ and $\alpha_A$ for the steel and aluminum components, respectively, and $\beta_S$ and $\beta_A$ are the reciprocals of the product of their elastic modulus and cross-sectional areas. The length of each component may be expressed as.

$$L_{AF,T} = L_{A20}(1+\beta_A(T_A-20))(1+\beta_A F_{Aave})$$

$$L_{SF,T} = L_{S20}(1+\alpha_S(T_S-20))(1+\beta_S F_{Save})$$

The reference lengths, $L_{A20}$ and $L_{S20}$ are not yet known, but, for any combination of temperature and average tension within the normal operating range, the length of each of the two components must equal the arc length established for the catenary. Therefore, $$L_{AF,T} = L_{SF,T} = S_1 + S_2 = S$$

The above equations can be rearranged to solve for the reference lengths as follows.

$$L_{A20} = \frac{S}{(1+\alpha_A(T_A-20))(1+\beta_A F_{Aave})}$$

$$L_{S20} = \frac{S}{(1+\alpha_S(T_S-20))(1+\beta_S F_{Save})}$$

The sum of the two average tensions, $F_{Aave}$ and $F_{Save}$, is equal to the total average tension, $F_{ave}$, established by the catenary analysis. Thus, $$F_{Save} = F_{ave} - F_{Aave}$$

Eliminating $F_{Save}$, the equation for $L_{S20}$ becomes, $$L_{S20} = \frac{S}{(1+\alpha_S(T_S-20))(1+\beta_S F_{ave} - \beta_S F_{Aave})}$$

The two equations for the reference lengths now contain three unknowns, $L_{A20}$, $L_{S20}$, and $F_{Aave}$, and cannot be solved directly in closed form. However, if two sets of catenary data are obtained at two different temperatures, the two equations for $L_{A20}$ and $L_{S20}$ can be written twice. Since the reference lengths are constant over a short time period, only the $F_{Aave}$ unknown will be different. There are now four equations with four unknowns that can be solved in closed form. If the subscripts T1 and T2 are attached to the parameters that change with temperature, the four equations become, $$L_{A20} = \frac{S_{T1}}{(1+\alpha_A(T_{A,T1}-20))(1+\beta_A F_{Aave,T1})} \quad (8)$$

$$L_{S20} = \frac{S_{T1}}{(1+\alpha_S(T_{S,T1}-20))(1+\beta_S F_{Aave,T1} - \beta_S F_{Aave,T1})} \quad (9)$$

$$L_{A20} = \frac{S_{T1}}{(1+\alpha_A(T_{A,T2}-20))(1+\beta_A F_{Aave,T2})} \quad (10)$$

$$L_{S20} = \frac{S_{T2}}{(1+\alpha_S(T_{S,T2}-20))(1+\beta_S F_{ave,T2} - \beta_S F_{Aave,T2})} \quad (11)$$

Combining the two equations for each reference length by dividing one by the other, the reference lengths can be eliminated, yielding Equation 12 for $L_{A20}$ and Equation 13 for $L_{S20}$.

$$\frac{S_{T1}}{S_{T2}} = \frac{(1+\alpha_A(T_{A,T1}-20))(1+\beta_A F_{Aave,T1})}{(1+\alpha_A(T_{A,T2}-20))(1+\beta_A F_{Aave,T2})} \quad (12)$$

$$\frac{S_{T1}}{S_{T2}} = \frac{(1+\alpha_S(T_{S,T1}-20))(1+\beta_S F_{ave,T1} - \beta_S F_{Aave,T1}))}{(1+\alpha_S(T_{S,T2}-20))(1+\beta_S F_{ave,T1} - \beta_S F_{Aave,T2})} \quad (13)$$

Designating the inverse ration of the temperature adjustment terms as $T_A$ and $T_S$, Equation 12 yields, $$T_A = \frac{(1+\alpha_A(T_{A,T2}-20))}{(1+\alpha_A(T_{A,T1}-20))}$$

and Equation 13 yields, $$T_S = \frac{(1+\alpha_S(T_{S,T2}-20))}{(1+\alpha_S(T_{S,T1}-20))}$$

Combining these temperature ratios with the arc ratios, two simplified parameters, $C_A$ and $C_S$, are formed.

$$C_A = \frac{S_{T1} T_A}{S_{T2}}$$

-continued $$C_S = \frac{S_{T1}T_S}{S_{T2}}$$

Equation 12 now may be solved for $F_{Aave,T1}$ in terms of $F_{Aave,T2}$.

$$F_{Aave,T1} = C_A/\beta_A - 1/\beta_A + C_A F_{Aave,T2} \quad (14)$$

Substituting this expression for $F_{Aave,T1}$ into Equation 13 yields Equation 15, a closed form expression for $F_{Aave,T2}$ in terms of parameters determined by the catenary analysis of two different sets of measured data.

$$F_{Aave,T2} = \frac{1 + \beta_S(F_{ave,T1} - C_A/\beta_A + 1/\beta_A - C_S F_{ave,T2})}{\beta_S(C_A - C_S)} \quad (15)$$

The desired reference lengths now may be computed by substituting the appropriate average tension values $F_{Aave,T1}$ or $F_{Aave,T2}$ into Equation 8 or 10 to obtain $L_{A20}$, and into Equation 9 or 11 to obtain $L_{S20}$.

The actual values of the un-stretched lengths of the two components at 20° C. are not necessarily equal. They will depend on the methods used to install the conductor and the temperature conditions during installation, and may be difficult to predict.

With the reference lengths determined (equations 8, 10 and equations 9, 11), the weight correction can be carried out in the same way defined above for the single component material, except that the weight for each component is adjusted for each new arc length relative to the 20° C. un-stretched weight of each component, $w_{S20}$ and $w_{A20}$. Thus, $$w_{20} = w_{S20} + w_{A20}$$

$$w_{SF,T} = \frac{w_{S20}}{(1 + \alpha_S(T_S - 20))(1 + \beta_S F_{Save})}$$

$$w_{AF,T} = \frac{w_{A20}}{(1 + \alpha_A(T_A - 20))(1 + \beta_A F_{Aave})}$$

$$w_{F,T} = w_{SF,T} + w_{AF,T}$$

If the reference length of the aluminum component does not change due to creep, the two 20° C. reference lengths will be constant, independent of temperature and tension. If creep occurs after the sensor has begun monitoring the span, the reference lengths will change over time from previous values for any given set of temperature and tension data. In either case, the two most recent reference lengths reflect the actual state of the conductor, and track changes that occur as additional creep is experienced by the aluminum component.

Figure 3:
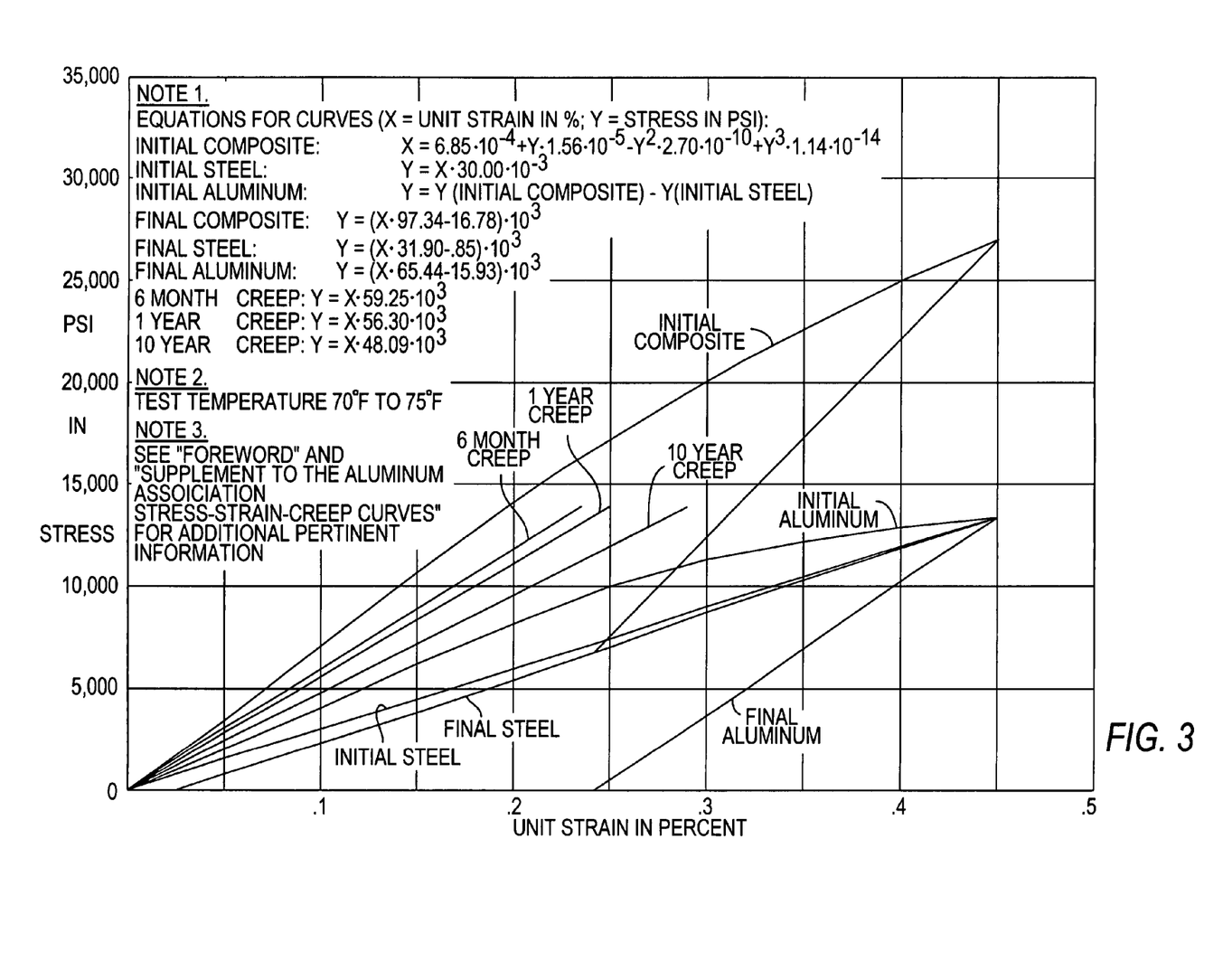
FIG. 3 is a graphical representation of the stress characteristics of typical conductors.

When a transmission line is designed, it is customary to compute the state of the catenary at a temperature of 120° F. (48.9° C.) after an equivalent of 10 years in service to establish the sag that is expected at that point in the life of the installation. A profile drawing of each span in the line is made showing the initial span, and the expected span after 10 years of creep. The conductor characteristics that are used for the 10 year span calculation have been determined experimentally by the conductor manufacturers and published by The Aluminum Association for the more common conductor sizes, differentiated by the number of wires in the aluminum and steel components. An example for ACSR conductors with 54 aluminum wires and 7 steel wires, covering a size range from 605.0 MCM (thousand circular mils) through 1033.5 MCM is illustrated in FIG. 3. It can be seen that for this construction, the aluminum component is expected to experience an increase in length of 0.00243 inches per inch relative to the steel component at room temperature. The ratio of the two reference lengths found by the real-time method described above can be compared to this expected ratio of 1.00243 to determine how much creep has actually occurred. If the ratio is smaller, the creep experienced up to that time is less than the expected 10-year creep, and if it is larger, more creep has been experienced. In either case, the determined real-time ratings using the present reference lengths based on the actual observed catenary parameters are accurate.

The determination of the reference lengths that provide the basis for the calculation of clearance-limited real-time ratings is based on two data sets obtained at different conductor temperatures. A real-time rating system that uses the sensor described herein typically acquires a data set every minute, and the calculations of the state of the catenary and the dynamic real-time ratings that may include ratings based on pre-defined clearance limits are performed immediately following the receipt of each data set. It has been observed that the conductor temperature typically follows a daily cycle imposed on the air temperature cycle. Therefore, it is convenient to schedule an update of the reference length computation once a day, using data from the lowest and the highest conductor temperatures experienced over the last 24 hours. Since the lowest temperatures tend to occur in the early morning hours, and the highest temperatures tend to occur in the early afternoon hours, a logical time to schedule a daily update of the reference parameters is midnight.

Capturing the data at the time of the upper and lower conductor temperature peaks, however, may not be the optimum time. If the conductor temperature is changing, the conductor length is also changing, resulting in vertical movement of the suspended portion of the catenary. This movement requires dynamic forces to accelerate and decelerate the mass of the conductor, and introduces a time delay in the movement of the conductor relative to a change in the conductor temperature. These forces are superimposed on the static force distribution in the conductor and could lead to a small error in the computed catenary parameters if they are not properly accounted for. By selecting data at the upper and lower peaks of the inclination angle rather than the peak temperatures, the conductor will be stationary at the time of a peak, and this source of potential error is avoided.

Each minute, the inclination angle is compared to the highest and lowest previous values, and if the present angle exceeds either, it is placed in memory as the new extreme value. At midnight, the calculations are made, and the highest and lowest angle points are reset to the present angle value. The computed reference lengths then become the reference lengths to be used for the catenary parameter and real-time rating calculations for the entire day. This schedule has the advantage that the reference length parameters remain constant during the day. Of course, the time of the update can be scheduled for any convenient time without loss of accuracy, or it could be keyed to the behavior of the angle data, or any other data.

It is prudent to set a lower limit for the difference between the highest and lowest conductor temperature, below which the daily calculation will not be done. A temperature difference of at least 10° C. is suggested to be applicable for most installations.

Although preferred embodiments of the present invention and modifications thereof have been disclosed and described in detail herein, it is to be understood that this invention is not limited to those precise embodiments and modifications, and that other modifications and variations may be effected by one skilled in the art without departing from the spirit and scope of the invention as defined by the appended claims.

The invention claimed is:

1. An apparatus for determining the maximum conductor current loading of an overhead transmission line or conductor that comprises a spanning transmission line catenary spanning two transmission line towers, comprising:
   a sensing device adapted to be clamped to said overhead transmission line or conductor near one of the two said transmission line towers to acquire real-time information and including a transmitter for transmitting said acquired real-time information to a remote information processing center, said acquired real-time information including at least parameters of an angle of inclination from a horizontal line of said transmission line or conductor and a surface temperature of said transmission line or conductor; and
   means for performing a two step iterative process using said angle of inclination to determine the present sag of said transmission line or conductor;
   wherein said performing means performs a first step that operates in accordance with the algorithm wherein a value for said conductor's unit weight w and a value for horizontal tension in the conductor $F_h$ is assumed and a horizontal distance $X_1$ from the lowest point of said spanning transmission line catenary to said transmission line tower closest to said sensor is first assumed to be equal to a horizontal distance $X_2$ from said lowest point to the other said transmission line tower, wherein $X_1+X_2=X_0$, the horizontal distance between said two transmission line towers, and $Y_1$ and $Y_2$ are sags relative to said respective transmission line towers determined in accordance with the following Equation (1):

$$Sag = Y = \frac{F_h}{w}\left[\cosh\left(\frac{w}{F_h}X\right) - 1\right] \quad (1)$$

and $X_1$ is reduced by an incremental amount and $X_2$ is increased by said incremental amount if $Y_2-Y_1<H$, where H is the difference in height between said transmission line towers and said Equation (1) is repeated successively until $Y_2-Y_1 \geq H$, at which time $X_1$ is increased by said incremental amount and $X_2$ is reduced by said incremental amount, said incremental amount is decreased by dividing it by a fixed factor, said decreased incremental amount is subtracted from $X_1$ and added to $X_2$ and said sags $Y_1$ and $Y_2$ are computed in accordance with Equation (1), said difference $Y_2-Y_1$ is compared to said H, and said iterative process is repeated successively until $Y_2-Y_1$ is substantially equal to said H, thereby determining the position of said lowest point of said catenary consistent with said assumed horizontal tension $F_h$.

2. The apparatus according to claim 1 wherein said performing means performs a second step that operates in accordance with the algorithm wherein a value for an angle $\theta$ from a horizontal line to a line tangent to said catenary at the end closest to said sensor is calculated using said assumed value for said horizontal tension $F_h$ and said determined position of said lowest point of said catenary defined by $X_1$ and $X_2$, said angle $\theta$ being calculated by computing the length of the arc $S_1$ between said end point of said catenary closest to said sensor and said lowest point of said catenary in accordance with Equation (2):

$$\text{Arc} = S_1 = \frac{F_h}{w}\sinh\left(\frac{w}{F_h}X_1\right) \quad (2)$$

and said arc $S_1$ has a weight $W_1$, wherein $W_1 = w\,S_1$ and said angle $\theta$ is computed with Equation (3):

$$\theta = \tan^{-1}(W_1/F_h) \quad (3)$$

wherein said angle $\theta$ is compared to said acquired angle and if said angle is greater than said acquired angle, said assumed value for the horizontal tension, $F_h$, is incrementally increased whereafter said first step is repeated with said increased value of $F_h$ to establish the location of a new lowest point of said catenary, and said second step is repeated to determine a new angle $\theta$ that is compared to said acquired angle, thereby the value of said $F_h$ is increased until the angle $\theta$ is no longer greater than said acquired angle, whereupon said $F_h$ is decreased by said increment, said increment is decreased by dividing it by a factor, said decreased increment is added to $F_h$, and said first and second steps are repeated until said computed angle $\theta$ and said acquired angle are substantially equal, whereupon said horizontal tension $F_h$ and said location of the lowest point of the catenary are established for the conditions in effect at the time said angle of inclination is acquired.

3. The apparatus according to claim 1, wherein said performing means includes means using said acquired conductor surface temperature to correct the conductor reference weight for thermal expansion effects.

4. The apparatus according to claim 1 wherein said performing means performs a second step that operates in accordance with the algorithm wherein a sag calculated with said Equation (1) is compared to a pre-defined allowable maximum sag at the lowest point of the catenary, and if said calculated sag is greater than said pre-defined allowable maximum sag, the assumed horizontal tension $F_h$ is incrementally increased whereafter said first step is repeated with said increased value of $F_h$ to establish the location of a new lowest point of the catenary, and said second step is repeated to determine a new sag that is compared to said pre-defined allowable maximum sag, thereby the value of said $F_h$ is increased until said calculated sag is no longer greater than said pre-defined allowable maximum sag, whereupon said $F_h$ is decreased by said increment, said increment is decreased by dividing it by a factor, said decreased increment is added to $F_h$, and said first and second steps are repeated until said calculated sag and said pre-defined allowable maximum sag are substantially equal, whereupon said horizontal tension $F_h$ and said location of the lowest point of the catenary are established for the conditions in effect at the time that the sag of the catenary equals said pre-defined allowable maximum sag.

5. The apparatus according to claim 4, wherein said performing means determines a limiting maximum temperature of said transmission line or conductor based on said maximum sag or said minimum clearance.

6. The apparatus according to claim 1 wherein said performing means performs a second step that operates in accordance with the algorithm wherein a clearance between elevations of a point on the catenary and a specific point below the catenary is calculated with said Equation (1) wherein the X parameter is set equal to $X_1$ or $X_2$, whichever contains said point on the catenary, minus the distance from the respective tower to said point on the catenary, and the clearance, computed as the difference between the elevation of said respective tower minus said sag $Y_1$ or $Y_2$ associated with $X_1$ or $X_2$, plus said sag computed with said X parameter, minus said elevation of said specific point, is compared to a pre-defined allowable minimum clearance, and if said clearance is less than said pre-defined allowable minimum clearance, the assumed horizontal tension $F_h$ is incrementally increased whereafter said first step is repeated with said increased value of $F_h$ to establish the location of a new lowest point of the catenary, and said second step is repeated to determine a new clearance that is compared to said pre-defined allowable minimum clearance, thereby the value of said assumed $F_h$ is increased until said calculated clearance is no longer greater than said pre-defined allowable minimum clearance, whereupon said $F_h$ is decreased by said increment, said increment is decreased by dividing it by a factor, said decreased increment is added to $F_h$, and said first and second steps are repeated until said calculated clearance and said pre-defined allowable minimum clearance are substantially equal, whereupon said horizontal tension $F_h$ and said location of the lowest point of the catenary are established for the conditions in effect at the time that the clearance of the catenary equals said pre-defined allowable minimum clearance.

7. The apparatus according to claim 6, wherein said performing means determines a limiting maximum temperature of said transmission line or conductor based on said maximum sag or said minimum clearance.

8. The apparatus according to claim 1, wherein said performing means includes means for obtaining a measure of the present load current on said transmission line or conductor to determine present weather conditions controlling present heat dissipation parameters of said transmission line or conductor.

9. The apparatus according to claim 8, wherein said performing means includes means for computing maximum allowable load current with said present weather conditions that limits the temperature of said transmission line or conductor to said maximum allowed temperature.

* * * * *